UNITED STATES PATENT OFFICE.

JOHN LEONARD KELLOGG, OF BATTLE CREEK, MICHIGAN, ASSIGNOR TO KELLOGG TOASTED CORN FLAKE COMPANY, OF BATTLE CREEK, MICHIGAN, A CORPORATION OF MICHIGAN.

MANUFACTURE OF BRAN FOOD.

1,189,129.          Specification of Letters Patent.      Patented June 27, 1916.

No Drawing.      Application filed December 17, 1915.   Serial No. 67,322.

*To all whom it may concern:*

Be it known that I, JOHN LEONARD KELLOGG, a citizen of the United States, residing in Battle Creek, in the county of Calhoun and State of Michigan, have invented a new and useful Improvement in the Manufacture of Bran Food, (Case B,) of which the following is a specification.

My invention relates to the manufacture of a laxative cereal food from bran, and has for its principal object to provide a bran food of this nature which is more palatable and digestible than the bran foods commonly sold, and which can be eaten alone or in combination with any other cereal food, or with sugar and cream or other food elements like other cereal foods.

In a prior application for patent filed by me September 18, 1915, Serial No. 51,325, I have described the manufacture of bran food from bran alone.

In my present invention I use bran in combination with wheat or other cereal, preferably some glutenous cereal flour, so as to make a very palatable and nourishing, as well as healthful, product.

In order that the nature of my invention may be clearly understood, I shall first describe in detail one mode in which I at present prefer to make the improved product, and then define the scope of the invention in the claims.

In the at present preferred mode of carrying out my invention, I take the desired quantity of pure bran, preferably wheat bran, which has been thoroughly cleaned, and add thereto any desired quantity from 5% to 50% of wholewheat flour or any other gelatinous cereal flour. The entire mass is then mixed together with sufficient moisture, preferably in an ordinary mixer, then rolled out into sheets, and the sheets cooked in steam retorts at a temperature of about 250° F. for about fifteen minutes. The resulting slabs of cooked dough are then by preference broken up into small particles, each about the size of a pea, which particles are then flaked on ordinary flaking rolls, dried and toasted by the method commonly used in the manufacture of other toasted and flaked cereal foods. The product is then ready for the market, and makes a very palatable and nourishing, as well as healthful, bran food.

It is evident that the process above described can be greatly varied in its performance without departing from the scope and spirit of my invention and without essentially changing the nature and advantages of the product.

I claim as my invention:

1. A process of preparing a bran food, in the performance of which from 5% to 50% of gelatinous cereal flour is mixed with pure bran, the mixture moistened and rolled into sheets, the sheets cooked into slabs, the slabs broken into small pieces and the pieces flaked and toasted.

2. A process of preparing a bran food, in the performance of which a mixture of bran and cereal flour is moistened, cooked, flaked and toasted, substantially as set forth.

3. A bran food consisting of cooked, flaked and toasted pieces of a mixture of pure bran and 5% to 50% of gelatinous cereal flour.

JOHN LEONARD KELLOGG.